(12) United States Patent
Wachob et al.

(10) Patent No.: US 11,057,615 B2
(45) Date of Patent: Jul. 6, 2021

(54) INVENTORY TRACKING IN CABLE TV SYSTEM

(71) Applicant: Antronix Inc., Cranbury, NJ (US)

(72) Inventors: David Wachob, New Hope, PA (US); Neil Tang, Princeton, NJ (US); Michael Wu, New Brunswick, NJ (US)

(73) Assignee: Antronix Inc.

( * ) Notice: Subject to any disclaimer, the term of this patent is extended or adjusted under 35 U.S.C. 154(b) by 0 days.

(21) Appl. No.: 16/574,774

(22) Filed: Sep. 18, 2019

(65) Prior Publication Data

US 2020/0092542 A1 Mar. 19, 2020

Related U.S. Application Data

(60) Provisional application No. 62/732,648, filed on Sep. 18, 2018.

(51) Int. Cl.
*H04N 17/00* (2006.01)
*H04L 27/00* (2006.01)
*H04N 7/22* (2006.01)
*H04B 3/46* (2015.01)

(52) U.S. Cl.
CPC ............. *H04N 17/004* (2013.01); *H04B 3/46* (2013.01); *H04L 27/0002* (2013.01); *H04N 7/22* (2013.01)

(58) Field of Classification Search
CPC .......... H04N 17/004; H04N 7/22; H04N 3/26; H04L 27/0002
USPC ....................................................... 348/181
See application file for complete search history.

(56) References Cited

U.S. PATENT DOCUMENTS

| | | |
|---|---|---|
| 3,375,451 A | 3/1968 | Borelli et al. |
| 5,642,155 A | 6/1997 | Cheng |
| 6,094,211 A * | 7/2000 | Baran ..................... H04N 7/102 348/614 |
| 6,112,232 A | 8/2000 | Shahar et al. |
| 6,941,576 B2 | 9/2005 | Amit |
| 6,978,476 B2 | 12/2005 | Zimmerman |
| 7,640,121 B2 | 12/2009 | Anderson |
| 7,750,791 B2 | 7/2010 | Grego |
| 7,895,632 B2 | 2/2011 | Sadja et al. |
| 7,904,932 B2 | 3/2011 | Dounaevski et al. |
| 8,643,538 B2 | 2/2014 | Schantz et al. |

(Continued)

FOREIGN PATENT DOCUMENTS

WO WO-2007040347 A1 * 4/2007 ........... H04N 7/1675

*Primary Examiner* — Michael Lee
(74) *Attorney, Agent, or Firm* — The Belles Group, P.C.

(57) ABSTRACT

A system, method, and/or apparatus may track an intermediary device within a communications system. For example, a first signal may be transmitted from a first device in a communications system to the intermediary device in the communications system. The first signal from the first device may be modified (e.g., by a passive component of the intermediary device) to create a modified signal. The modified signal may be passed by the intermediary device to a second device in the communications system. The second device may be upstream or downstream from the first device and the intermediary device in the communications system. A type for the intermediary device may be determined based on the modification to the first signal. The second device may be configured to determine an identify of the first device associated with the intermediary device.

14 Claims, 2 Drawing Sheets

(56) References Cited

U.S. PATENT DOCUMENTS

| | | | |
|---|---|---|---|
| 9,516,376 B2 | 12/2016 | Wells et al. | |
| 2002/0169914 A1* | 11/2002 | Shteyn | H04L 12/282 |
| | | | 710/305 |
| 2002/0188668 A1* | 12/2002 | Jeffery | H04M 11/062 |
| | | | 709/203 |
| 2005/0145688 A1* | 7/2005 | Milenkovic | G08B 21/0261 |
| | | | 235/375 |
| 2005/0248438 A1* | 11/2005 | Hughes | G06K 19/0717 |
| | | | 340/10.4 |
| 2008/0013612 A1* | 1/2008 | Miller | H04L 12/2838 |
| | | | 375/224 |
| 2009/0146812 A1* | 6/2009 | Rice | G06K 19/0723 |
| | | | 340/572.1 |
| 2009/0323972 A1* | 12/2009 | Kohno | H04L 9/0631 |
| | | | 380/284 |
| 2014/0123203 A1 | 5/2014 | Oliver et al. | |
| 2014/0177657 A1* | 6/2014 | Bowcutt | H04B 10/077 |
| | | | 370/535 |
| 2016/0364680 A1* | 12/2016 | Debates | G06K 7/0008 |
| 2017/0026685 A1* | 1/2017 | Xiu | H04B 1/0057 |
| 2017/0201804 A1* | 7/2017 | Stafford | H04L 12/2801 |

\* cited by examiner

INVENTORY TRACKING IN CABLE TV SYSTEM

CROSS REFERENCE TO RELATED APPLICATIONS

Priority is claimed to U.S. Provisional Application Ser. No. 62/732,648, filed Sep. 18, 2018. The disclosure of the aforementioned priority application is incorporated herein by reference in its entirety.

BACKGROUND

Cable television (CATV) is a system of delivering television programming to consumers via radio frequency (RF) signals transmitted through coaxial cables, or in more recent systems, light pulses through fiber-optic cables. CATV network operators, like other telecommunications providers, install considerable hardware into their networks. With respect to tracking, this hardware is often passive, meaning there are no active (powered) components within the hardware and/or means to communicate the hardware's existence to a centralized location. As a result, a network operator cannot accurately track the location of the hardware once it is installed in the field. The current method for tracking installed hardware in the field relies upon data logging into some form of database, manual or otherwise, once the hardware is installed. This method is both time consuming and error prone, if even done at all. Thus, there is need for an improved method of inventory tracking in a CATV system.

BRIEF SUMMARY

The present disclosure may be directed, in an aspect, to a method of tracking hardware in a cable television system using circuitry (e.g., passive tracking circuitry). A first signal may be transmitted from a first device in the cable television system to an intermediary device in the cable television system. The first signal from the first device may be modified (e.g., modified by the passive component of the intermediary device) to create a modified signal. The modified signal may be passed through the intermediary device to a second device in the cable television system. The second device may be upstream or downstream from the first device and the intermediary device in the cable television system. A type for the intermediary device may be determined based on the modification to the first signal. The second device may be configured to determine an identify of the first device associated with the intermediary device.

In another aspect, a cable television system for tracking an intermediary device may include a first device configured to transmit a first signal. A component (e.g., a passive component) within the intermediary device may be configured to receive the first signal from the first device and/or modify the first signal to create a modified signal. A second device may be configured to receive the modified signal, the second device being upstream or downstream from the first device and the intermediary device in the cable television system. A device (e.g., the second device) may be configured determine a type for the intermediary device based on the modification to the first signal.

In another aspect, a passive component for coupling to an intermediary device within a cable television system may include a tracking circuit. The tracking circuit may be separate (e.g., separate in functionality) from an existing circuit of the intermediary device. The tracking circuit may be configured to receive a first signal from a first device in the cable television system, modify the first signal to create a modified signal, and/or pass the modified signal to a second device in the cable television system. The second device may be upstream or downstream from the first device and the intermediary device in the cable television system. The second device may be configured to determine a type for the intermediary device, for example, based on the modification to the first signal.

BRIEF DESCRIPTION OF THE DRAWINGS

The present disclosure will become more fully understood from the detailed description and the accompanying drawings, wherein.

DETAILED DESCRIPTION

Figure 1:
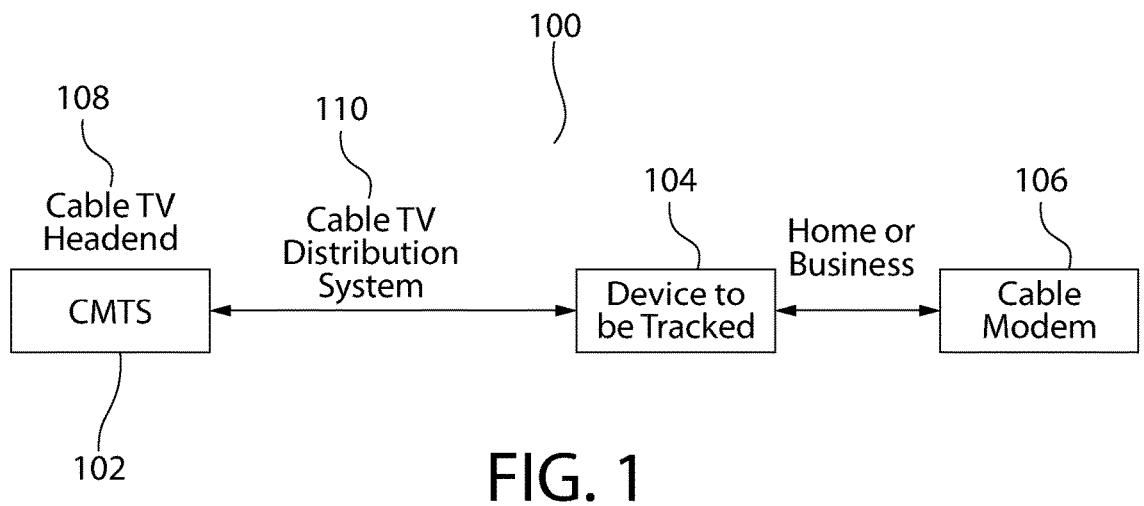
FIG. 1 is a block diagram of an example cable television system including a device to be tracked.

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present inventions. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require a particular orientation unless explicitly indicated as such. Terms such as "attached," "affixed," "connected," "coupled," "interconnected," "secured" and other similar terms refer to a relationship wherein structures are secured or attached to one another either directly or indirectly through intervening structures, as well as both movable or rigid attachments or relationships, unless expressly described otherwise. The discussion herein describes and illustrates some possible non-limiting combinations of features that may exist alone or in other combinations of features. Furthermore, as used herein, the term "or" is to be interpreted as a logical operator that results in true whenever one or more of its operands are true. Furthermore, as used herein, the phrase "based on" is to be interpreted as meaning "based at least in part on," and therefore is not limited to an interpretation of "based entirely on."

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Referring now to the figures, FIG. 1 is a block diagram of an example cable television (CATV) system 100. CATV system 100 includes a cable modem termination system (CMTS) 102, device to be tracked 104, and a cable modem 106. As an example, cable modem 106 and a device to be tracked 104 may be located within a home, business, or any other location that desires content provided via cable.

Cable modem 106 and device to be tracked 104 may be connected to a CMTS 102, for example, at and/or via cable TV headend 108. Cable modem 106 and device to be tracked 104 may be connected to a CMTS 102 by the cable TV distribution system 110. One or more of the devices may communicate with one another via one or more known methods, including lines of fiber optic and/or coaxial cable.

The device to be tracked 104 may be passive or active. The device to be tracked 104 may include a component (e.g., tracking circuitry), although in other examples the tracking circuitry may be external to the device to be tracked 104. The component (e.g., tracking circuitry) may be passive. For example, the passive component may not generate energy and/or may not introduce net energy into a circuit. The passive component may include a filter (e.g., a band-stop filter, a band-pass filter, etc.).

Cable modem 106 may be a high-speed data transceiver that receives and transmits data (e.g., high speed data) between one or more locations (e.g., homes or businesses) and/or devices, such as the cable TV headend 108. The data may be transmitted over the cable TV distribution system 110, which may be a hybrid fiber/coax (HFC) distribution system. A (e.g., each) cable modem 106 may include an identification that may be unique, such as a MAC address or other unique identifier. High-speed data transmission may be performed via one or more standards. For example, a standard for high-speed data transmission in CATV system 100 may be the Data over Cable Service Interface Specification (DOCSIS, such as DOCSIS 3.0 OR 3.1), although such standard is for illustration purposes only and one or more other standards (e.g., communication standards) may be used.

Communication may be provided upstream and/or downstream. For example, DOCSIS may provide for downstream communication paths from the cable TV headend 108 to a home or business (e.g., in the 85 MHz to 1002 MHz range). Also, or alternatively, DOCSIS may provide for upstream communication paths (e.g., from 5 MHz to 65 MHz range) between the home or business and cable TV headend 108, although frequency ranges may vary by the standard (e.g., DOCSIS) being used, the desire of the cable TV network operator to expand capacity, etc.

At cable TV headend 108, the CMTS 102 may receive and/or transmit (e.g., independently receive and/or transmit) high speed data to one or more (e.g., each, unique) cable modems 106 in the home and/or business on the same frequency (e.g., DOCSIS frequency) allocations, which may be reversed relative to the cable modem's 106 transmit and/or receive frequencies. The CMTS 102 may sequentially receive and/or transmit high speed data to one or more (e.g., each, unique) cable modems.

The CMTS 102 may include a processor, which can control and process the data which is sent to and received from one or more (e.g., each, unique) cable modem 106. Alternatively, the CMTS 102, the processor of the CMTS 102, and/or a portion of the processor may be included in a device (e.g., separate and independent device) within or remote from the cable TV headend 108. One or more portions of the CMTS 102 may be located (e.g., independently and/or separated located) within the cable TV distribution system 110.

As described herein, FIG. 1 includes device to be tracked 104, which may be located upstream of the cable modem 106 (e.g., between the cable modem 106 and the CMTS 102) and/or downstream of the CMTS 102. The device to be tracked 104 may be any number of devices, including (but not limited to) an amplifier, gateway, filter, or splitter typically located adjacent to (e.g., near) a home or business and/or within a home or business and used by a cable TV operator. The device to be tracked 104 may be installed by a cable TV operator, the tenant or owner of the home or business, or third party contractor. Because the device to be tracked 104 is upstream of the cable modem 106, communications (e.g., all downstream and upstream communications) between the CMTS 102 and cable modem 106 may flow through the device to be tracked 104.

Although FIG. 1 shows a single device to be tracked 104, it should be understood that such example is for illustration purposes only and that one or more devices to be tracked 104 may be included in a CATV system 100. For example, cable modem 106 may be associated with two different devices that can be tracked, rather than just a single device. The first device to be tracked may be of a type different than the type of the second device to be tracked. For example, the first device to be tracked may be an amplifier, and the second device to be tracked may be a gateway. The first device to be tracked may be configured to modify the signal transmitted by the cable modem, and the second device to be tracked may be configured to modify the signal in a different manner (see FIG. 5, discussed below). The CMTS 102 may be configured to differentiate between the modification of the signal by the first device to be tracked and the modification of the signal by the second device to be tracked, and thereby determine the types of the first device and the second device.

Further, the system 100 may include multiple cable modems (as opposed to a single cable modem 106), each modem associated with one or more devices to be tracked. To identify which device is associated with which cable modem, the CMTS 102 may be configured to associate the received modified signal with the cable modem transmitting the signal.

Figure 2:
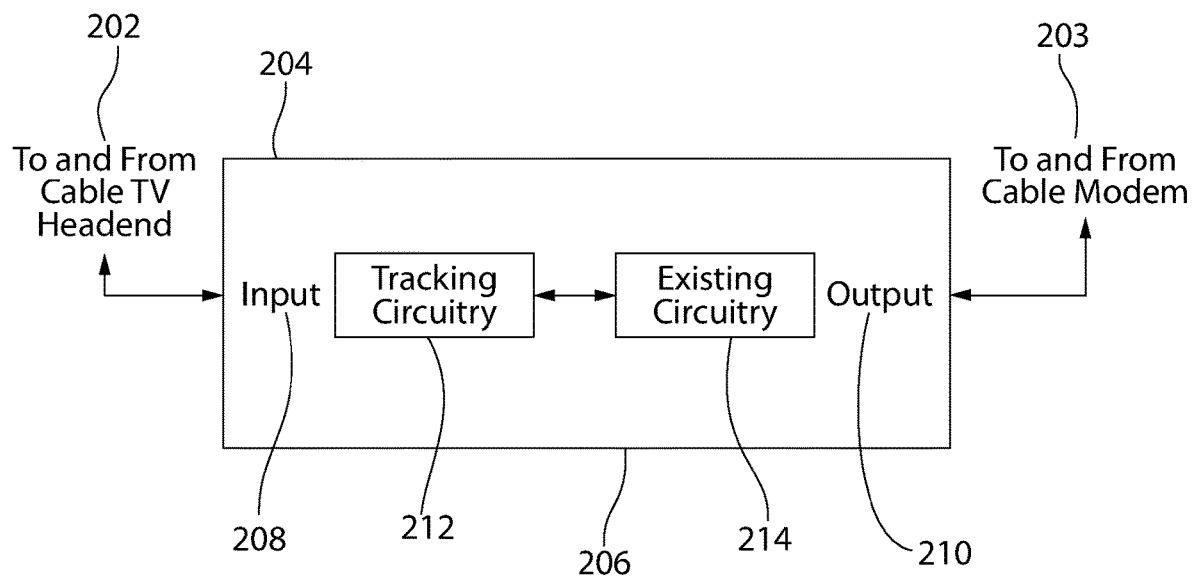
FIG. 2 is a block diagram of an example device to be tracked.

FIG. 2 is a block diagram of an example device to be tracked 204. Device to be tracked 204 may be located within a home or business, located outside a home or business, and the like. Device to be tracked 204 may be positioned between two or more devices that communicate with one another. For example, device to be tracked 204 may be positioned between the cable modem 106 and CMTS 102, as shown on FIG. 1.

Device to be tracked 204 may include interfaces, such as input 208 and/or output 210. Input 208 and/or output 210 may be any components and/or devices used to receive signals and/or provide signals. In nonlimiting examples, input 208 may receive a signal from cable headend, as shown on 202, and output 210 may provide a signal to cable modem, as shown on 203. In examples, however, output may be provided to Cable TV Headend and/or input may be provided by cable modem. A signal may be an electrical or electromagnetic current that is used for carrying data from one device or network to another. The data may be related to audio content, video content, synchronization data, communication data, etc.

Device to be tracked 204 may include existing circuitry 214, which may provide functionality (e.g., core functionality) provided by the device, such as an amplifier, gateway, filter, or splitter, etc. Device to be tracked 204 may include tracking circuitry 212. Tracking circuitry 212 may be used to provide a tracking capability, such as an ability to track the device to be tracked 204. Tracking circuitry 212 may be added to existing circuitry 214 and/or may be separate from existing circuitry 214. Although FIG. 2 shows tracking circuitry 212 being located within device to be tracked 204, tracking circuitry 212 may be located external to device to be tracked 204, adjacent to device to be tracked 204, as well as any other location in which tracking circuitry 212 may enable the tracking of device to be tracked 204. For example, tracking circuitry 212 may located in any location upstream or downstream of device to be tracked 204 that may enable the tracking of device to be tracked 204.

As described herein, tracking circuitry 212 (e.g., filter within the tracking circuitry) may be a separate (e.g., external) component that may be added to device to be tracked 204 and/or that may be external to device to be tracked 204. For example, tracking circuitry 212 may be positioned within device to be tracked 204. In other examples, tracking circuitry 212 may be positioned (e.g., manually positioned) external to device to be tracked 204, such as adjacent to device to be tracked 204, between device to be tracked 204 and another device (such as CMTS 102 and/or cable modem 106), etc.

Examples in which tracking circuitry 212 is external to the device to be tracked 204 may enable retrofitting (retrofitting in the field) of a device with the tracking circuitry. For example, one or more devices may be positioned (e.g., positioned in the field) that include existing circuity 214 and that does not contain tracking circuity 212. In such examples the tracking circuitry 212 may be added to the devices, which may convert the devices to devices to be tracked 204. Thus, retrofitting solutions may be used to provide tracking capabilities to manufactured products that previously did not have tracking capabilities. In other examples, retrofitting solutions may be used to provide new or improved tracking capabilities to manufactured products that already had tracking capabilities. Tracking circuity 212 may be added to one or more devices notwithstanding the type of device, the manufacturer of the device, the amount of time in which the device has been in the field, the amount of power provided to and/or from the device, etc.

Tracking circuity 212 may be connected (e.g., added) via one or more connectors (e.g., F connectors, F-type connectors). For example, if tracking circuitry 212 is external to device to be tracked, the tracking circuity 212 may include a male F connector and/or a female F connector. The male F connector of the tracking circuitry may be located on the tracking circuitry closest to the device to be tracked, and the female F connector of the tracking circuitry may be located on the tracking circuity farthest from the device to be tracked.

Tracking circuitry 212 may include a filter. The filter may alter signals. For example, the filter may attenuate, block, and/or allow frequencies within a signal. The filter may alter signals transmitted upstream by the cable modem 106 to the cable TV headend 108 and/or may alter signals transmitted downstream by the cable TV headend 108 to the cable modem 106. The alteration of the upstream signal may be detected by the CMTS 102 (or other device) in the cable TV headend 108, such that the CMTS 102 can determine the presence and/or type of the device to be tracked 204 and/or the tracking circuitry 212 in device to be tracked 204. Although the disclosure may focus on the alteration of signals transmitted upstream, it should be understood that such an example is for illustration purposes only and other examples may be envisioned. For example, an alteration of the signals transmitted downstream may be detected by the cable modem 106 (or other device), such that the cable modem 106 can determine the presence and/or type of the device to be tracked 204 and/or the tracking circuitry 212 in device to be tracked 204.

In examples, one or more devices may be configured to determine an identity of one or more devices within the CATV system 100. For example, a CMTS may be configured to determine an identity of a cable modem and/or a device to be tracked. The alteration (e.g., attenuation, blocking) of a signal may correspond to the identity of a device (such as a cable modem and/or a device to be tracked, as provided in the foregoing example). The CMTS may investigate a signal to determine how the signal has been altered. Based on the alteration of the signal and a predefined altering of signals corresponding to devices, the CMTS can determine the cable modem that forwarded the signal, the device to be tracked (in which the signal passed through), as well as one or more other devices.

The presence and/or type of the device to be tracked 204 and/or the tracking circuitry 212 in device to be tracked 204 may be determined in and/or outside a home or business (e.g., a unique home or business). The type of the device to be tracked 204 may include a category. For example, a category for the type of the device to be tracked 204 may include an amplifier, gateway, filter, splitter, as well as any other device (e.g., passive or active device) used within he cable television system.

The alteration of a signal may be detected in one device and reported back to another device. For example, the alteration of a signal transmitted downstream may be detected in the cable modem 106 and reported back to the cable TV headend 108. In such an example the device that detects the alteration of the signal may determine the presence and/or type of the device to be tracked 204 and/or tracking circuitry 212 in device to be tracked 204. In other examples the device that detects the alteration of the signal may not determine the presence and/or type of the device to be tracked 204 and/or tracking circuitry 212 in device to be tracked 204. Rather, the device that detects the alteration of the signal may pass the information to another device and the other device may determine the presence and/or type of the device to be tracked 204 and/or tracking circuitry 212 in device to be tracked 204.

In examples, one or more devices may determine the presence and/or type of the device to be tracked 204 and/or tracking circuitry 212 in device to be tracked 204. For example, one or more of the devices that detects the alteration of the signal, that receives the report of the alteration of the signal, and/or that communicates with a device within the cable TV system 100, may determine the presence and/or type of the device to be tracked 204 and/or tracking circuitry 212 in device to be tracked 204.

As described herein, a filter may be included in tracking circuitry 212. The filter may be a notch filter, a band reject filter, and the like. The filter may be centered at a predefined frequency. For example, a filter may be centered at 6.0 MHz, which would effectively attenuate and/or block signals (e.g., communication signals, such as from the cable modem 106 to the CMTS 102) at 6.0 MHz.

The CMTS 102 may be configured to command one or more (e.g., each, unique) cable modems 106 to transmit upstream in one or more predefined (e.g., assigned) channels and time slots. For example, and upstream channel may be from 5 MHz to 11 MHz. In such an example, the absence of a signal at 6.0 MHz (e.g., in a specific home or business) would be detectable by the CMTS 102. Such an absence of a signal may be attributable to a presence of a device (e.g., a device to be tracked), a type (e.g., a type of a device to be tracked), etc. In examples the type of a device may include a category of a device, such as an amplifier, gateway, filter, splitter, and/or other device used by a cable TV operator.

Figure 3:
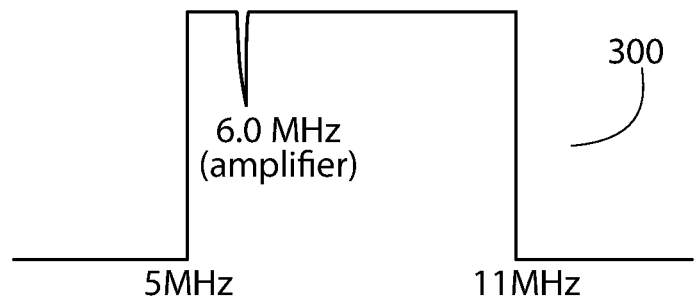
FIGS. 3-5 show channel signals in which notches are introduced to indicate different devices to be tracked.

FIG. 3 shows an example signal spectrum 300. In examples signal spectrum 300 may be representative of a signal received by the CMTS 102 from the home or business (e.g., specific home or business). Signal spectrum 300 may be on the channel which includes a filter that alters (e.g., attenuates, blocks) the signal at 6.0 MHz. The frequency that is altered may indicate the presence and/or type of a device. For example, the notch at 6.0 MHz may indicate the presence of a device that is an amplifier if amplifiers include a notch filter centered at 6.0 MHz (e.g., at that specific home or business). However, in other examples notches may be located at other frequencies and/or one or more devices (e.g., gateway device) may include notches that are located at one or more of the other frequencies.

In addition to a filter's (e.g., notch filter) center frequency, the filter may include a predefined width and/or depth. The width may be on the order of 10's of KHz and/or the depth may be on the order of 10's of dB, although other widths and/or depths are envisioned. The filter width may be used to determine the number of unique filters useable in a given frequency band. For example, widening the notch filter width may result in the CMTS being capable of detecting the presence of a specific notch filter. The wider notch filter width may limit the number of unique notch filter devices that can be detected within a given upstream channel.

The upstream channel may be a predefined DOCSIS channel, such that the cable modem 106 can transmit the channel and the CMTS 102 can receive the channel. As such, some or all of the upstream channel used to detect the Devices to be Tracked may be unuseable (e.g., potentially unuseable) for conventional upstream DOCSIS data communications. There may be tradeoffs between the depth of the notch filter depth and the cost and performance of the notch filter itself, which may be included within the device to be tracked 104.

As described herein, devices (e.g., different types of devices) may be associated with different notch frequencies. For example, a first device (e.g., first type of device) may include a notch filter centered at a predefined frequency (e.g., notch), and a second device (e.g., second type of device) may include a notch filter centered at a frequency that may be different than the frequency of the first device. As the devices (e.g., types of devices) may include notch filters centered at different frequencies, the presence and/or type of the device may be identified based on the frequencies that are received.

Figure 4:
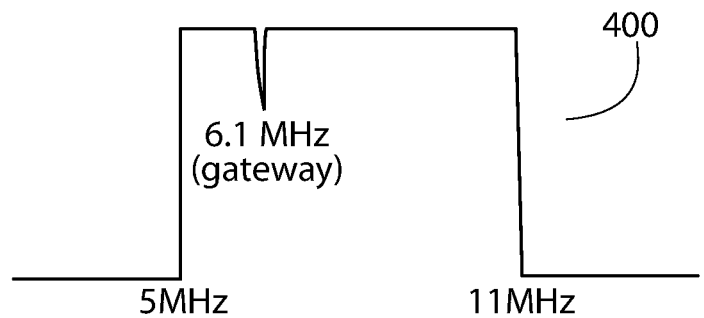

For example, a device to be tracked may be a gateway device. As shown on FIG. 4, the notch filters of gateway devices may be centered at a frequency of 6.1 MHz, although one or more other centerings of notch frequencies may be provided. Signal spectrum 400 (FIG. 4) may include a notch filter that alters (e.g., attenuates, blocks) the signal at 6.1 MHz, which may be the notch representative of the signal received by the CMTS of a gateway device (e.g., a gateway device from a specific home or business).

Another device to be tracked may be an amplifier. The amplifier may be centered at a frequency of 6.0 MHz, although such centered frequencies are for illustration purposes only and one or more devices may be centered at one or more frequencies. By including notch filters centered at different frequencies in different type of devices (e.g., devices to be tracked), the alteration(s) of the signals may be used to determine the presence and/or type of a device to be tracked. For example, the CMTS (or other device) may determine that frequencies 6.0 MHz and/or 6.1 MHz of a signal (e.g., an upstream signal) have been attenuated (e.g., blocked). Based on the frequencies that have been attenuated, the CMTS can determine the types of device(s) present in a specific home or business (e.g., a given home or business).

Figure 5:
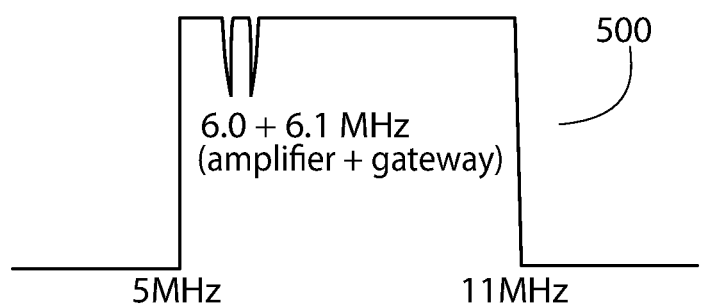

As described herein, the attenuation of a predefined frequency may indicate that a device associated with the attenuated frequency is present. For example, FIG. 5 shows signal 500. Signal 500 further shows that amplifier is associated with a 6.0 MHz notch and a gateway is associated with a 6.1 MHz notch. Consequently, an amplifier device and a gateway device may be detectable (e.g., detectable simultaneously) at the CMTS, based on the altering of the signal received at the CMTS. Further, although two devices (e.g., different devices) are described herein, examples are not so limiting, and such a number of devices and/or frequencies is provided for illustration purposes only. The number and/or type of devices to be tracked may be two or more devices and/or types of devices. The number of frequencies associated with a device to be tracked may include a single frequency or more than one frequency. For example, a gateway device may be associated with a 6.2 MHz notch and a 6.7 MHz. Further, as the address of a (e.g., each) device, such as a cable modem, may be unique, and the notch filter center frequencies of a (e.g., each) device to be tracked may be unique, one or more Devices to be Tracked could be detected at one or more specific homes or businesses. Further, as the address of devices may be unique, and the filter frequencies may be unique, a specific location (such as a home address) and the devices present at each location may be identified based on the altered (e.g., attenuated) signals.

Noise (random noise, and the like) may be present in communication systems including the DOCSIS system used within a cable TV network (such as cable TV system 100) and described herein. In an example, readings (e.g., multiple readings) and/or statistics may be used to improve the accuracy of tracking individual devices. For example, if readings (e.g., multiple consecutive readings) are taken and recorded at 6.0 MHz, the effects of noise may be minimized. The multiple readings may be analyzed (e.g., analyzed statistically) to determine a signal level (e.g., the average signal level) present at 6.0 MHz over the multiple consecutive readings.

Readings (e.g., similar readings, such as similar multiple readings) may be taken, recorded, and/or analyzed (e.g., statistically analyzed) at frequencies that may be removed from a defined frequency. For example, readings may be taken, recorded, and/or analyzed at frequencies that may be removed from 6.0 MHz. In an example, removed frequencies (e.g., two slightly removed frequencies) may include 5.95 MHz and 6.05 MHz outside the bandwidth of the 6.0 Mhz notch filter. By comparing the signal levels (e.g., average signal levels) present at frequencies (e.g., all frequencies, such as frequencies 5.95 MHz, 6.0 MHz, and 6.05 MHz), the effects of noise present may be minimized. Such technique may be used to improve the determination of whether a device to be tracked is present that includes a filter at 6.0 MHz, for example.

In examples it may be difficult to determine with certainty that a device to be tracked is present that includes a filter (e.g., a predefined filter). It may be difficult to determine with certainty that a device to be tracked is present that includes a predefined filter because of noise and such. For example, it may be difficult to determine with certainty that a device to be tracked is present that includes a filter at 6.0

MHz. While it may be difficult to determine with certainty that a device to be tracked is present that includes a filter (e.g., a predefined filter, such as a filter at 6.0 MHz), the probability that a device to be tracked is present that includes a predefined filter (e.g., a filter at 6.0 MHz) may be determined. The probability that a device to be tracked is present that includes a predefined filter may be determined analytically. For example, the probability may be determined analytically from the average signal levels present at frequencies, such as frequencies 5.95 MHz, 6.0 MHz, and 6.05 MHz, and/or the levels (e.g., relative levels) of signal levels (e.g., average signal levels) present of the frequencies (e.g., all of the frequencies).

A device, such as the CMTS, may be capable of detecting the presence or absence of Orthogonal frequency-division multiplexing (OFDM) sub carriers (e.g., specific and discrete OFDM sub carriers) present within a system, such as the DOCSIS system. The CMTS may be capable of detecting the presence or absence of specific and discrete OFDM sub carriers present in addition to (or as part of) taking readings of the signal levels (e.g., specific signal levels) described herein. The number and/or locations for the OFDM sub carriers may be defined (e.g., precisely defined) within one or more standards, such as the DOCSIS standard.

It should be understood that while the examples provided herein describe detecting one or more devices by using the frequency band from 5 MHz to 11 MHz, the use of this band is for illustration purposes only and one or more other bands may be used to detect devices. For example, bands may include 36 MHz to 42 MHz, 79 MHz to 85 MHz, etc. Further, the description of a notch band reject filter (e.g., for the tracking circuitry) is for illustration purposes and is not limiting. For example, one or more filters may be envisioned for tracking a device, such as a notch band pass filter, a high pass filter, a low pass filter, and the like. Further, one or more components (e.g., components in tracking circuitry) may be configured to alter the phase and/or other detectable signal characteristic rather than the amplitude of the transmitted signal. The altered signal, phase, etc. may be utilized and/or detected by one or more devices, such as the CMTS.

By incorporating one or more of the aforementioned tracking circuits into the devices to be tracked, cable TV network operations may be enabled to track the hardware that has been installed in their networks. Such tracking may be performed passively (e.g., without requiring power) or significant cost. Such tracking may be faster and/or more reliable than manual data logging, and may be performed remotely (e.g., remote from the home or business), the tracking may be performed in real time or non-real time, etc.

While the inventions have been described with respect to specific examples including presently preferred modes of carrying out the inventions, those skilled in the art will appreciate that there are numerous variations and permutations of the above described systems and techniques. For example, while embodiments detail implementation over a CATV network, those skilled in the art will appreciate that examples can apply (e.g., equally apply) over twisted pair (e.g., on a telecommunications network), or fiber optic cable and optical signals on a telecommunications system. It is to be understood that other embodiments may be utilized, and structural and functional modifications may be made without departing from the scope of the present inventions. Thus, the spirit and scope of the inventions should be construed broadly as set forth in the appended claims.

We claim:

1. A communications system for tracking an intermediary device, the system comprising:
   a cable modem configured to transmit a first signal;
   a passive component within the intermediary device, the passive component configured to:
   receive the first signal from the cable modem; and
   modify the first signal to create a modified signal; and
   a cable modem termination system (CMTS) configured to:
   receive the modified signal, the CMTS being upstream from the cable modem and the intermediary device in the communications system; and
   determine a type for the intermediary device based on the modification to the first signal.

2. The communications system of claim 1 wherein the first signal comprises high-speed data from a home or business using the cable modem.

3. The communications system of claim 1 wherein the type of the intermediary device is an amplifier, a gateway, a filter, or a splitter.

4. The communications system of claim 1 further comprising a second intermediary device of a type different from the type of the intermediary device, the intermediary device and the second intermediary device associated with the cable modem,
   wherein a second passive component of the second intermediary device is configured to modify the first signal in a manner different from the modification by the passive component of the intermediary device;
   wherein in the determination of the type of the intermediary device, the CMTS is configured to differentiate between the modification of the first signal by the passive component of the intermediary device and the modification of the first signal by the second passive component of the second intermediary device.

5. A method for tracking an intermediary device within a cable television system comprising:
   transmitting a first signal from a cable modem in a cable television system to the intermediary device in the cable television system;
   modifying, by a passive component of the intermediary device, the first signal from the cable modem to create a modified signal;
   passing the modified signal from the intermediary device to a CMTS in the cable television system, the CMTS being upstream from the cable modem and the intermediary device in the cable television system; and
   determining a type for the intermediary device based on the modification to the first signal.

6. The method of claim 5 wherein the determination of the type for the intermediary device is performed by the CMTS.

7. The method of claim 5 wherein the CMTS is further configured to determine, based on the modified signal, an identity and location of the cable modem associated with the intermediary device.

8. The method of claim 5 wherein in the cable television system, the CMTS receiving the modified signal is upstream from the intermediary device, and the intermediary device is upstream from the cable modem sending the first signal.

9. The method of claim 5 wherein the first signal comprises high-speed data from a home or business using the cable modem.

10. The method of claim 9 wherein the first signal is transmitted by the cable modem in response to receiving a command from the CMTS to send the first signal, and the CMTS associates the modified first signal with the cable modem transmitting the first signal.

11. The method of claim 5 wherein the type of the intermediary device is an amplifier, a gateway, a filter, or a splitter.

12. The method of claim 5 wherein the modification of the first signal comprises a frequency-based filtering carried out by the passive component being a notch or band reject filter, the filter attenuating frequencies centered at a predetermined frequency.

13. The method of claim 5 wherein the cable television system comprises a second intermediary device of a type different from the type of the intermediary device, the second intermediary device having a second passive component configured to modify the first signal in a manner different from the modification by the passive component of the intermediary device; and wherein in the determination of the type of the intermediary device, the CMTS is configured to differentiate between the modification of the first signal by the passive component of the intermediary device and the modification of the first signal by the second passive component of the second intermediary device.

14. The communications system of claim 1 wherein the passive component has no powered components and modifies the first signal in a non-adjustable manner.

* * * * *